Sept. 24, 1957 V. ANDERSON 2,807,142
HYDRAULIC DRIVE FOR BROACHING MACHINES
Filed May 31, 1956 3 Sheets-Sheet 1
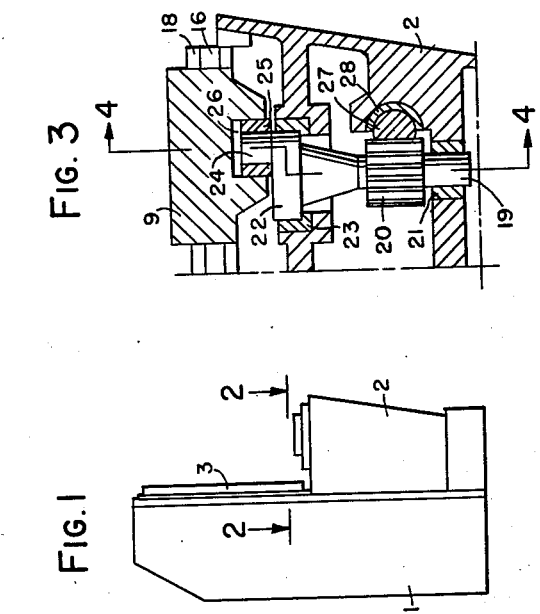
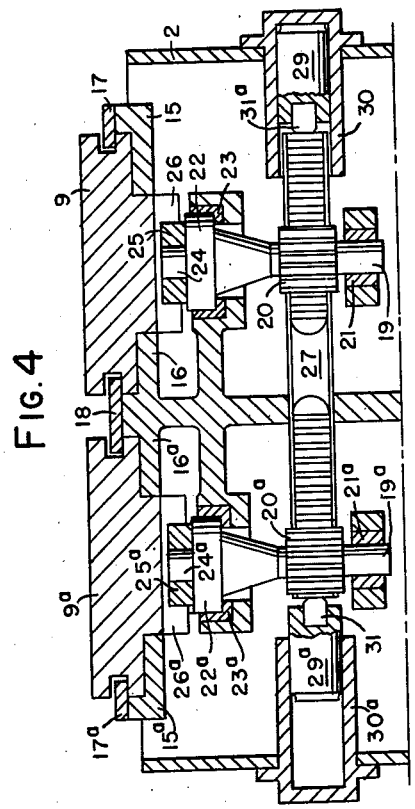
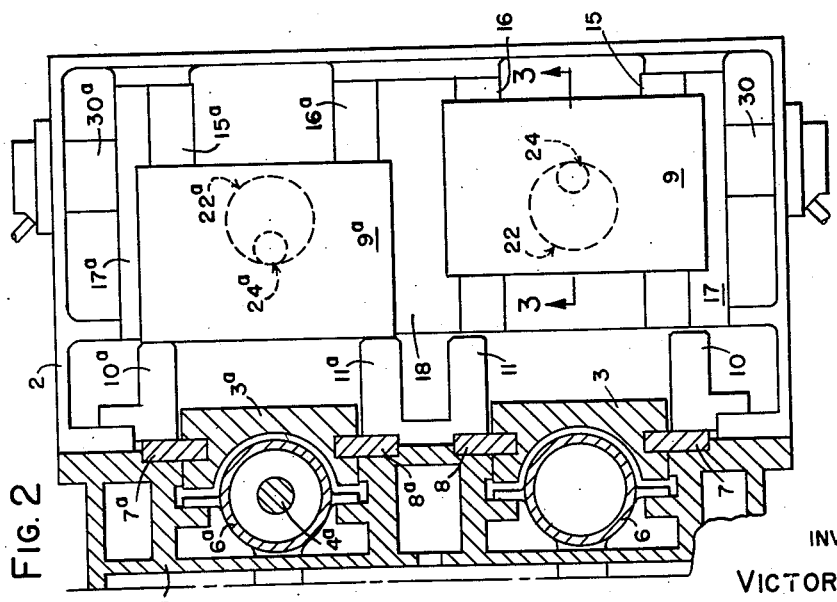
INVENTOR
VICTOR ANDERSON
BY *Wesley P. Merrill*
ATTORNEY

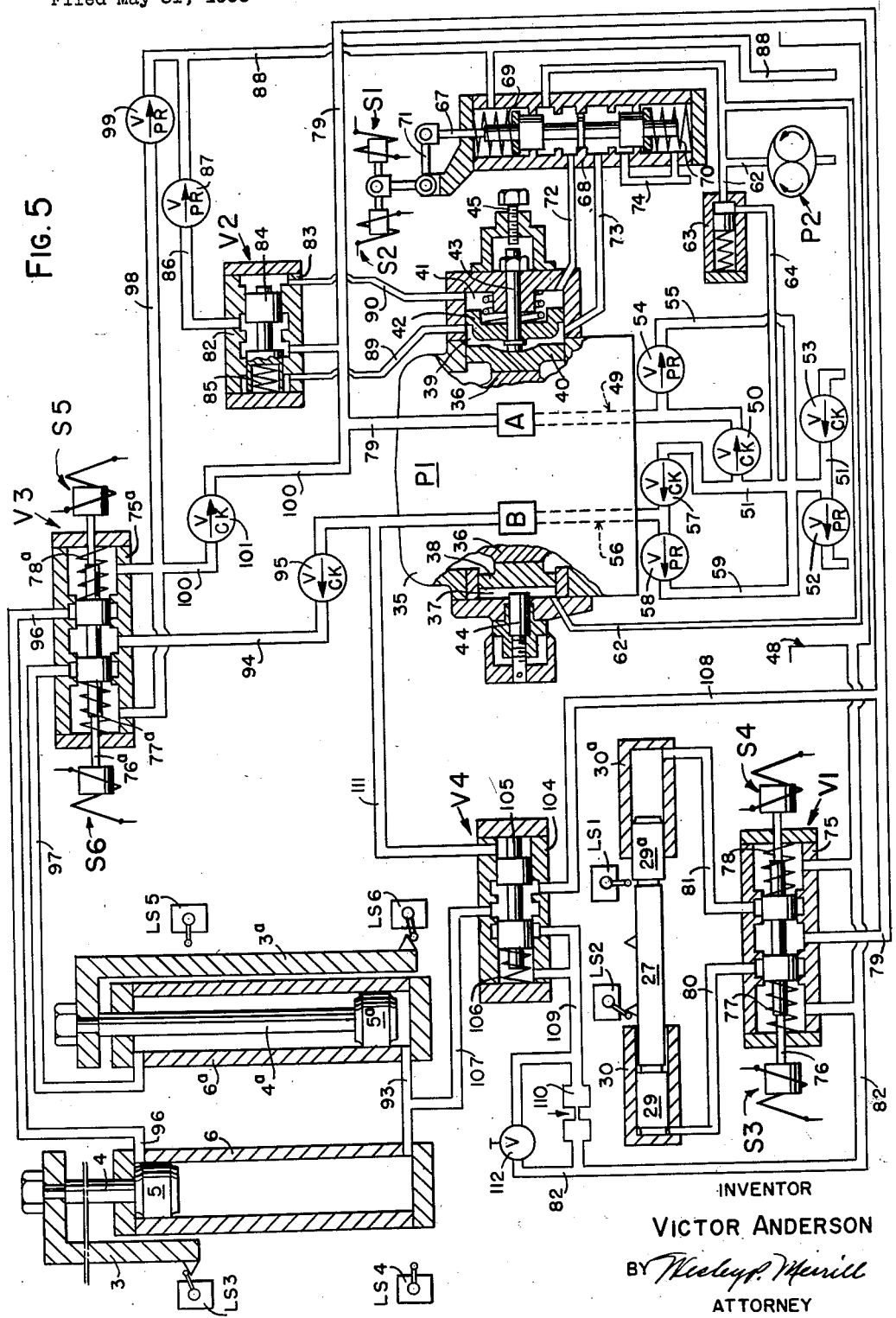

Sept. 24, 1957 V. ANDERSON 2,807,142
HYDRAULIC DRIVE FOR BROACHING MACHINES
Filed May 31, 1956 3 Sheets-Sheet 3
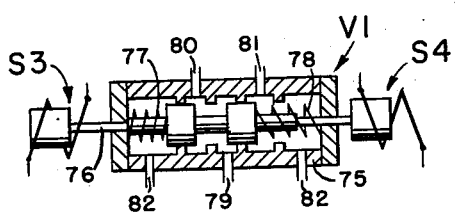
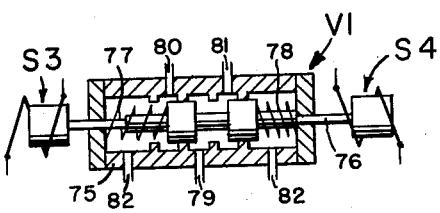
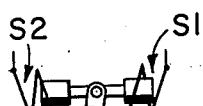
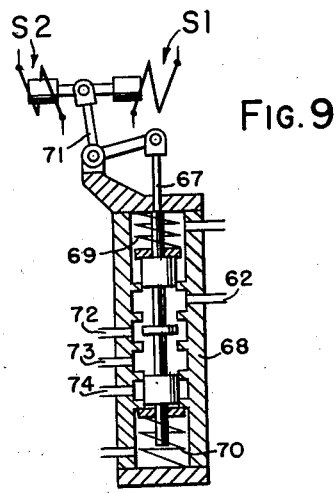
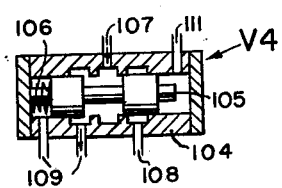
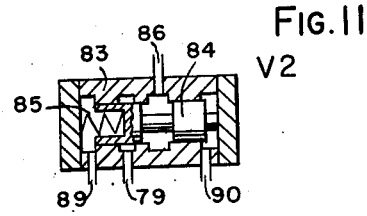
INVENTOR
VICTOR ANDERSON
BY *Wesley R. Merrill*
ATTORNEY United States Patent Office 2,807,142
Patented Sept. 24, 1957

2,807,142

HYDRAULIC DRIVE FOR BROACHING MACHINES

Victor Anderson, Detroit, Mich., assignor to The Oilgear Company, Milwaukee, Wis., a corporation of Wisconsin Application May 31, 1956, Serial No. 588,459

7 Claims. (Cl. 60—97)

This invention relates to hydraulic drives and it relates in particular to a hydraulic drive suitable for operating a broaching machine having two tool carrying slides which are reciprocated in opposite directions simultaneously and two work carriages which are reciprocated in opposite directions simultaneously to move the work carried thereby into and out of the paths of broaching tools carried by the tool slides.

A hydraulic drive for such a machine ordinarily includes hydraulic motors for reciprocating the slides and the carriages and a pump for energizing the motors. It has been common practice for many years to connect the motors to the pump with a slide motor and a carriage motor in series with each other so that each work carriage will complete its stroke before a tool slide starts to move.

Since the work carriage motors are quite small relatively to the tool slide motors, it is quite difficult in such a system to obtain the proper speeds of the carriages, particularly as each carriage should be accelerated and decelerated gradually. In order to overcome that difficulty, it has been common practice for some time to use the main pump for energizing the slide motors and to provide a smaller pump for energizing the carriage motors.

The present invention has as an object to provide a hydraulic drive in which a large motor and a small motor are energized by liquid supplied thereto by the same pump and the speeds of the motor can be accurately controlled.

A drive constructed according to the invention has the advantage that it is much less expensive than a drive having two pumps and it can be adjusted to operate the work carriages of broaching machines at any desired speed.

Other objects and advantages will appear from the following description of the hydraulic drive illustrated schematically in the accompanying drawings in which the views are as follows:

Fig. 1 is a side view of a broaching machine to which the invention may be applied.

Fig. 2 is in part a top plan view and in part a sectional plan view taken on the line 2—2 of Fig. 1 but drawn to a larger scale.

Fig. 3 is a vertical sectional view taken through one of the work carriages and its operating mechanism on the line 3—3 of Fig. 2.

Fig. 4 is a vertical section taken on the irregular line 4—4 of Fig. 3.

Fig. 5 is a hydraulic circuit diagram of a hydraulic drive in which the invention is embodied and which has been indicated as being applied to the broaching machine shown in Figs. 1–4.

Figs. 6 and 7 are views showing a directional control valve in positions different from that shown in Fig. 5.

Figs. 8 and 9 are views showing a pump control valve in positions different from that shown in Fig. 5.

Figs. 10 and 11 are views showing two other valves in positions different from those shown in Fig. 5.

The broaching machine shown in Figs. 1–4 has not been completely illustrated because it has been in extensive commercial use for many years and is illustrated and described in Patent No. 2,372,825 to which reference may be had. Therefore, only so much of the machine has been shown as is necessary to an understanding of the invention.

The operating mechanism of the machine is carried by a frame shown as consisting of a rear section 1 and a front section or knee 2 each of which has the several parts thereof formed into an integral structure as by being welded together or cast integral with each other. The two sections are rigidly but removably connected to each other as by being bolted together.

Frame section 1 has mounted thereon two vertically reciprocable tool carriers or slides 3 and 3ª each of which is adapted to have a broaching tool (not shown) fastened to the outer or front face thereof. Slide 3 is connected at its upper end by a piston rod 4 to a piston 5 fitted in a cylinder 6 which is rigidly secured to section 1 in a vertical position and forms with piston 5 a hydraulic motor for reciprocating slide 3 upon two guides 7 and 8. Slide 3ª is connected at its upper end by a piston rod 4ª to a piston 5ª fitted in a cylinder 6ª which is rigidly secured to section 1 in a vertical position and forms with piston 5ª a hydraulic motor for reciprocating slide 3ª upon two guides 7ª and 8ª. The guides are rigidly secured to section 1 and are closely fitted in complementary grooves formed in the sides of the slides.

Frame section 2 has two horizontally reciprocable work carriages 9 and 9ª mounted thereon in front of slides 3 and 3ª respectively. Each carriage is adapted to have the work to be broached (not shown) fastened thereon and to move it into and out of the path of the broaching tool carried by the slide in alignment with that carriage. When one carriage moves inward, the other moves outward and then one slide moves downward and the other moves upward.

Inward movement of carriage 9 is positively prevented by two stops 10 and 11 and inward movement of carriage 9ª is positively limited by two stops 10ª and 11ª. The stops are rigidly secured to the frame and have been shown as plain stops in order to simplify the drawing but in practice adjustable stops are employed.

Frame section 2 has rigidly secured thereto or formed integral therewith two horizontal ways 15 and 16, upon and between which carriage 9 is mounted, and two horizontal ways 15ª and 16ª upon and between which carriage 9ª is mounted. Ways 15 and 15ª have gibs 17 and 17ª fixed thereto, respectively, and extending into suitable grooves formed in the outer sides of the two carriages. Ways 16 and 16ª have a gib 18 fixed thereto and extending into suitable grooves formed in the adjacent sides of the carriages. The arrangement is such that each carriage can be freely moved toward and from the adjacent tool slide but is positively prevented from moving in any other direction.

The mechanism for reciprocating carriage 9 includes a crank shaft 19 which has a pinion 20 fixed thereon intermediate its ends and which has its lower end journaled in a bearing 21 carried by frame section 2. The upper portion of shaft 19 is enlarged to provide a large bearing portion 22 which is journaled in a bearing 23 carried by section 2 close to the underside of carriage 9. The bearing portion 22 of shaft 19 has a crank pin 24 fixed thereon or formed integral therewith and offset from the shaft axis. Crank pin 24 is closely fitted in a bearing block 25 which is closely fitted in a slot 26 formed in and extending transversely across the portion of carriage 9 which extends below ways 15 and 16.

The arrangement is such that, when shaft 19 is rotated in one direction or the other, crank pin 24 will move carriage 9 toward or from slide 3 and block 25 will move along slot 26. Stops 10 and 11 are so proportioned or adjusted that they will be contacted by carriage 9 just before crank pin 24 reaches dead center.

Since the two mechanisms for reciprocating the two carriages are identical and function in the same manner, like parts have been indicated by like reference numerals with the exponent "a" added to the reference numerals applied to the mechanism for reciprocating carriage 9$^a$ and further description thereof is unnecessary.

In order that crank shafts 19 and 19$^a$ may be rotated simultaneously, pinions 20 and 20$^a$ mesh with rack teeth formed on a rack bar 27 which is suitably supported in such a manner that it may be reciprocated transversely of the machine and the rack teeth thereon retained in proper mesh with pinions 20 and 20$^a$. As shown, rack bar 27 is supported at a point opposite each of pinions 20 and 20$^a$ by a half bearing 28 (Fig. 3) which is carried by the frame.

Rack bar 27 has been shown as being reciprocable by two pistons 29 and 29$^a$ which are fitted, respectively, in cylinders 30 and 30$^a$ carried by frame section 2. In order that the carriage operating mechanism may be so adjusted that one of the crank pins 24 and 24$^a$ will be at or very slightly beyond dead center when rack bar 27 reaches the limit of its movement in one direction and the other crank pin will be at or very slightly beyond dead center when rack bar 27 reaches the limit of its movement in the opposite direction, motion is transmitted to rack bar 27 from pistons 29 and 29$^a$ through two spacer blocks 31 and 31$^a$ which may be cut to the exact length necessary to stop rack bar 27 when either pin reaches or passes very slightly beyond dead center.

Liquid for energizing the hydraulic motors is supplied by a reversible pump P1 having two ports A and B either of which may be the discharge port and the other the intake port. Pump P1 has been indicated as being of a type so well known that illustration and description thereof in detail is unnecessary. It is deemed sufficient to state herein that the mechanism of pump P1 is arranged within a case 35 and includes a displacement varying member or slide block 36, and that pump P1 when driven will discharge liquid in a direction and at a rate determined by the direction and distance slide block 36 is offset from its neutral or zero displacement position.

Slide block 36 is continuously urged toward the right in respect to the drawing by a hydraulic servo-motor comprising a cylinder 37, which is carried by case 35, and a piston 38 which engages slide block 36 and is fitted in cylinder 37. Slide block 36 is adapted to be moved toward the left beyond its neutral position by a servo-motor comprising a cylinder 39, which is carried by case 35, and a piston 40 which engages slide block 36 and is fitted in cylinder 39. Slide block 36 is adapted to be moved toward neutral from a position at the right of neutral by a servo-motor comprising a cylinder 41, which is carried by cylinder 39, and a piston 42 which is fitted in cylinder 41 and is fitted upon an adjustable stop rod 43 which limits the movement of piston 42 toward the left.

Pistons 40 and 42 have a cross-section area about twice that of piston 38 so that, when liquid is supplied to cylinders 37, 39 and 41 at the same pressure, either of pistons 40 and 42 can move slide block 36 toward the left against the force exerted by piston 38. Movement of slide block 36 toward the left is limited by an adjustable stop 44 and movement of slide block 36 toward the right is limited by an adjustable stop 45.

The arrangement is such that, when cylinders 39 and 41 are connected to exhaust and cylinder 37 is supplied with liquid, piston 38 will move slide block 36 and piston 40 toward the right until piston 40 has moved rod 43 into contact with stop 45 in which position of slide block 36 pump P1 will discharge liquid through port A at a rate which will enable motors 29—30 and 29$^a$—30$^a$ to operate work carriages 9 and 9$^a$ at the desired speed. Then when cylinder 39 is connected to exhaust and cylinder 41 is supplied with liquid, piston 42 will move slide block 36 toward the left until further movement of piston 42 is arrested by rod 43 which, in the present instance, is so adjusted that slide block 36 is stopped just short of neutral in which position of slide block 36 pump P1 will discharge liquid through port A at a rate slightly in excess of the rate at which liquid leaks out of the system at a predetermined low pressure.

When liquid is supplied to cylinder 39, piston 40 will move slide block 36 toward the left until further movement thereof is arrested by stop 44 in which position of slide block 36 pump P1 will discharge liquid through port B at a rate which will enable motors 4—6 and 4$^a$—6$^a$ to operate tool slides 3 and 3$^a$ at the desired speed.

Pump P1 is adapted to draw liquid from a reservoir 48 which has been shown separate from pump case 35 but in practice reservoir 48 constitutes a base upon which case 35 is mounted. Port A of pump P1 is connected by a channel 49 to the outlet of a check valve 50 the inlet of which is connected by a channel 51 to the inlet of a low pressure relief valve 52, which discharges into reservoir 48, and to the outlet of a check valve 53 through which liquid may be drawn from reservoir 48 by pump P1. Channel 49 is also connected through a high pressure relief valve 54 and a channel 55 to channel 51. Port B is connected by a channel 56 to the outlet of a check valve 57 the inlet of which is connected to channel 51. Channel 56 is also connected through a high pressure relief valve 58 and a channel 59 to channel 51.

The arrangement is such that, when pump P1 is discharging through port B, it may draw liquid from reservoir 48 through check valve 53, channel 51, check valve 50 and channel 49 into port A and, if pump pressure should exceed a predetermined maximum, pump P1 can discharge liquid through channel 56, relief valve 58, channels 59 and 51 and relief valve 52 into reservoir 48. Conversely, when pump P1 is discharging through port A, it may draw liquid from reservoir 48 through check valve 53, channel 51, check valve 57 and channel 56 into port B and, if pump pressure should exceed a predetermined maximum, pump P1 can discharge liquid through channel 49, relief valve 54, channels 55 and 51 and relief valve 52 into reservoir 48.

The check valves and the relief valves described above and the channels connected thereto have been shown separate from pump case 35 and reservoir 48 but in practice they are arranged within reservoir 48 or in pump case 35.

Liquid for energizing servo-motors 37—38, 39—40 and 40—42 is supplied by a gear pump P2 which has been shown separate from pump P1 but actually it is driven in unison with pump P1 and arranged within case 35 according to common practice. Pump P2 draws liquid from reservoir 48 and discharges it into a branched supply channel 62 one branch of which is connected to cylinder 37. A second branch of channel 62 is connected to the inlet of a resistance valve 63 the outlet of which is connected by a channel 64 to channel 51. Resistance valve 63 enables pump P1 to maintain a constant low pressure in channel 62 and in cylinder 37.

Flow of liquid to and from servo-motor cylinders 39 and 41 is controlled by a pilot valve 67 which in practice is very small and has its body formed integral with the upper wall of cylinder 41. As shown, valve 67 is fitted in a body 68 and urged to a central position by two springs 69 and 70. Valve 67 is adapted to be moved in one direction or the other by one or the other of two solenoids S1 and S2 to which it is connected by a linkage 71. Body 68 has a branch of supply channel 62 connected thereto. Cylinder 41 is connected by a channel 72 to body 68 a short distance below channel 62, cylinder 39 is connected by a channel 73 to body 68 a short distance below channel 72, and an exhaust channel 74 is connected to body 68 a short distance below channel 73.

The arrangement is such that, if pump P1 is being driven and valve 67 is in its central position as shown, cylinder 39 is connected to exhaust, piston 42 is subjected to gear pump pressure and is holding slide block 36 in its minimum displacement position, and pump P1 will discharge liquid through port A at a minimum rate.

When solenoid S1 is energized, valve 67 will be shifted downward to the position shown in Fig. 8 and will connect cylinders 39 and 41 to exhaust, thereby permitting piston 38 to move slide block 36 toward the right to the limit of its movement which will cause pump P1 to discharge liquid at a more rapid rate through port A. When solenoid S1 is de-energized and solenoid S2 is energized, valve 67 will be raised to the position shown in Fig. 9 and will permit liquid to flow from supply channel 62 into cylinders 39 and 41 and enable pistons 40 and 42 to moev slide block 36 toward the left to the limit of its movement which will cause pump P1 to discharge liquid through port B at a maximum rate. When both of solenoids S1 and S2 are deenergized, spring 69 or 70 will return pilot valve 67 to its central position and slide block 36 will be returned to its minimum displacement position.

The liquid discharged by pump P1 through port A is employed to operate motors 29—30 and 29ª—30ª. The flow of liquid to and from those motors is controlled by a valve V1 comprising a valve body 75 and a valve plunger 76 which is fitted in body 75 and urged to a central or neutral position by two springs 77 and 78. Plunger 76 is adapted to be shifted in one direction or the other in response to energization of one or the other of two solenoids S3 and S4 which have been shown connected directly to plunger 76 in order to simplify the drawing but in practice plunger 76 is shifted hydraulically under the control of a pilot valve which is solenoid operated.

Port A of pump P1 is connected by a channel 79 to valve body 75 intermediate the ends thereof. Cylinders 30 and 30ª are connected, respectively, by two channels 80 and 81 to body 75 at opposite sides of channel 79. The end portions of body 75 are connected to an exhaust channel 82 which discharges into reservoir 48.

The arrangement is such that, when pump P1 is discharging liquid into channel 79 and solenoid S3 is energized, plunger 76 will be shifted toward the left into the position shown in Fig. 6 and liquid will flow from channel 79 through valve V1 and channel 80 to cylinder 30 and cause piston 29 to move rack bar 27 and piston 29ª toward the right and piston 29ª to eject liquid from cylinder 30ª through channel 81, valve V1 and channel 82 into reservoir 48. When solenoid S3 is de-energized and solenoid S4 is energized, plunger 76 will be shifted toward the right into the position shown in Fig. 7 and liquid will flow from channel 79 through valve V1 and channel 81 into cylinder 30ª and cause piston 29ª to move rack bar 27 and piston 29 toward the left and piston 29 to eject liquid from cylinder 30 through channel 80, valve V1 and channel 82 into reservoir 48. When both solenoids are de-energized, plunger 76 will be centered by springs 77 and 78.

It has previously been stated that, when pilot valve 67 is in the position shown in Fig. 5, pump P1 when driven will discharge liquid at a rate slightly in excess of the leakage in the system. In order to provide for exhaust of the excess liquid, a bypass valve V2 is provided. As shown, valve V2 includes a valve body 83 and a plunger 84 which is fitted in body 83 and is urged toward the right by a spring 85. Valve body 83 has connected thereto a low branch of channel 79 and a channel 86 which has a low pressure resistance valve 87 arranged therein and is connected to an exhaust channel 88 which discharges into reservoir 48. The end of body 83 containing spring 85 is connected to servo-motor cylinder 39 by a channel 89 and the other end of body 83 is connected to servo-motor cylinder 41 by a channel 90.

The arrangement is such that, when cylinders 39 and 41 are both supplied with liquid under pressure or are both connected to exhaust, there is no pressure differential at opposite ends of valve plunger 84 and spring 85 will hold plunger 84 in its right hand position as shown in Fig. 11 in which position plunger 84 will block communication between channels 79 and 86 so that no liquid can escape through valve V2. But when cylinder 39 is connected to exhaust and cylinder 41 is supplied with liquid under pressure, liquid will flow from cylinder 41 through channel 90 and will move plunger 84 into the position shown in Fig. 5. Then liquid discharged by pump P1 in excess of requirements can flow from channel 79 through valve V2, channel 86, resistance valve 87 and channel 88 into reservoir 48 and valve 87 will enable pump P1 to maintain a low pressure in channel 79.

Tool slide motors 4—6 and 4ª—6ª at the lower ends thereof are connected to each other by a channel 93 so that, when liquid is supplied to the upper end of one motor and forces its piston downward, the liquid ejected by that piston will flow through channel 93 into the other motor and will raise the piston thereof.

Flow of liquid to and from motors 4—6 and 4ª—6ª is under the control of a valve V3 operation of which is effected by two solenoids S5 and S6. In practice, valve V3 is larger than valve V1 but the two valves have been shown as being alike and like parts thereof have been indicated by like reference numerals with the exponent "a" added to the reference numerals applied to valve V3 so that further description thereof is unnecessary.

Valve V3 is connected intermediate its ends to port B of pump P1 by a channel 94 having a check valve 95 arranged therein. The upper ends of cylinders 6 and 6ª are connected, respectively, by two channels 96 and 97 to valve V3 at opposite sides of channel 94. The end portions of valve V3 communicate with a channel 98 which is connected to exhaust channel 88 through a resistance valve 99 and which is also connected to channel 79 through a channel 100 having arranged therein a check valve 101 to prevent flow from channel 79 into channel 98.

The arrangement is such that, when pump P1 is discharging liquid into channel 94 and solenoid S5 is energized, plunger 76ª will be moved to its right hand position and liquid will flow from channel 94 through valve V3 and channel 96 into cylinder 6 and cause piston 5 to move slide 3 downward. The liquid expelled from cylinder 6 by piston 5 will flow through channel 93 into cylinder 6ª and cause piston 5ª to raise slide 3ª. Conversely, when solenoid S6 is energized, plunger 76ª will be moved to its left hand position and liquid will flow from channel 94 through valve V3 and channel 97 into cylinder 6ª and cause piston 5ª to move slide 3ª downward. The liquid expelled from cylinder 6ª by piston 5ª will flow through channel 93 into cylinder 6 and cause piston 5 to raise slide 3.

In order that the upward moving tool slide 3 or 3ª may reach its upper limit only after the downward moving slide has reached the end of its working stroke, a very small quantity of liquid is permitted to escape from channel 93 during the downward stroke of either slide.

As shown, escape of liquid from channel 93 is under the control of a bleed valve V4 comprising a valve body 104 and a valve plunger 105 which is fitted in valve body 104 and urged toward the right by a spring 106. Body 104 is connected at a point intermediate its ends to channel 93 by a channel 107, it is connected at one side of channel 107 to channel 79 by a channel 108, and it is connected at the other side of channel 107 to exhaust channel 82 by a channel 109 having a choke 110 arranged therein. The right end of body 104 is connected to channel 94 by a channel 111. In order that the lengths of the strokes of slides 3 and 3ª may be changed, a normally closed valve 112 is connected in parallel with choke 110.

The arrangement is such that, when pump P1 discharges liquid into channel 94 which causes one of the tool slide motor pistons to move downward and the other to move upward as explained above, pressure will extend from channel 94 through channel 111 into valve V4 and move its plunger 105 to the position shown in Fig 10 which will permit liquid to escape at a very limited rate from channel 93 through channel 107, valve V4, channel 109, choke 110 and channel 82 into reservoir 48. The volume of liquid which escapes through valve V4 is so small that the upward moving piston is short of its upper limit only a short distance, such as an inch, when the downward moving piston reaches the end of its stroke.

When pump P1 is reversed and discharges liquid into channel 79, the pressure in channels 94 and 111 will drop and permit spring 106 to return plunger 105 of valve V4 to the position shown in Fig. 5. Then liquid will flow from channel 79 through channel 108, valve V4 and channels 107 and 93 into cylinder 6 or 6a and cause the piston therein to complete its up stroke.

The machine has been shown provided with a plurality of limit switches for controlling operation of the several solenoids which effect operation of certain valves, but in some instances pressure switches may be employed. As shown, the machine is provided with two limit switches LS1 and LS2 one or the other of which is operated in response to rack bar 27 reaching the limit of its movement in one or the other direction, two limit switches LS3 and LS4 one of which is operated in response to tool slide 3 reaching the limit of its movement in either direction, and two limit switches LS5 and LS6 one of which is operated in response to tool slide 3a reaching the limit of its movement in either direction. The above switches and the other switches including a starting switch are connected into an electric circuit which has not been illustrated as it is arranged according to common practice.

*Operation*

Assuming that tool slide 3a has completed a working stroke, that pumps P1 and P2 are running, that the machine is idle and the parts are in the positions shown, the machine will operate as follows:

Pump P1 will be at its minimum displacement and will be discharging liquid through port A, channel 79, valve V2, channel 86, resistance valve 87 and channel 88 into reservoir 48. Valve 87 will cause pump P1 to create a low pressure which will extend through channels 79 and 108, valve V4 and channels 107 and 93 into cylinder 6 and hold-up piston 5. Pump P2 will deliver a part of its output to port B of pump P1 and will discharge the balance of its output through resistance valve 63 and relief valve 52 which will enable pump P2 to maintain a low pressure in cylinder 41 and that pressure will extend through channel 90 into valve V2 and hold it open as shown in Fig. 5.

When solenoids S1 and S3 are energized as by closing a starting switch, solenoid S1 will shift pilot valve 67 into the position shown in Fig. 8 to connect servo-motor cylinders 39 and 41 to drain which will cause pump P1 to discharge liquid through port A at a rate determined by stop 45 as previously explained. Connecting cylinder 41 to drain also eliminates the pressure in the end of valve V2 and permits it to be closed by spring 85 as shown in Fig. 11. Solenoid S3 will shift plunger 76 of valve V1 into the position shown in Fig. 6 so that the liquid discharged by pump P1 will flow through channel 79, valve V1 and channel 80 into cylinder 30 and cause piston 29 to move rack bar 27 toward the right, thereby retracting carriage 9a and advancing carriage 9.

Just after carriage 9 engages stops 10 and 11, rack bar 27 will complete its stroke and effect operation of limit switch LS1 which will cause solenoid S1 to be de-energized and solenoids S2 and S5 to be energized. Solenoid S5 will shift plunger 76a of valve V4 toward the right into a position corresponding to that shown in Fig. 7. Solenoid S2 will shift pilot valve 67 into the position shown in Fig. 9 which will cause pump P1 to discharge through port B as previously explained. Liquid discharged by pump P1 will flow through channels 94 and 111 into the end of valve V4 and shift its plunger 105 into the position shown in Fig. 10, and then the liquid discharged by pump P1 will flow through channel 94, valve V3 and channel 96 into cylinder 6 and cause piston 5 to move tool slide 3 downward.

As piston 5 moves downward, it will eject liquid from cylinder 6 into channel 93 and nearly all of that liquid will enter cylinder 6a and cause piston 5a to raise slide 3a but a very small quantity of the liquid will escape from channel 93 through channel 107, valve V4, channel 109, choke 110 and channel 82 into reservoir 48 so that slide 3 will complete its down stroke before slide 3a completes its up stroke.

As piston 5a moves upward, it will expel liquid from cylinder 6a through channel 97, valve V3 and channels 98, 100 and 79 to port A of pump P1. At the same time, pump P2 is delivering liquid through channel 62, resistance valve 63, channels 64 and 51, check valve 50 and channel 49 to port A. The rate at which pump P2 discharges liquid is in excess of the combined rates at which liquid flows through choke 110 and at which liquid leaks out of the system so that pump P2 maintains a low pressure in port A and that pressure extends through channel 79, valve V1 and channel 80 into cylinder 30 and acts upon piston 29.

Tool slide 3 will continue downward until it effects operation of limit switch LS4 which will cause solenoids S2 and S3 to be de-energized and solenoids S1 to be energized. De-energizing solenoid S3 permits spring 77 to return plunger 76 of valve V1 to the position shown in Fig. 5. De-energizing solenoid S2 and energizing solenoid S1 effects reversal of pump P1, as previously explained, which will permit plunger 105 of valve V4 to be returned by spring 106 to the position shown in Fig. 5. Pump P1 will discharge liquid at a substantial rate through channels 79 and 108, valve V4 and channels 107 and 93 into cylinder 6a and cause piston 5a to move slide block 3a upward until it effects operation of limit switch LS5.

If the electric circuit is adjusted to effect full automatic operation of the machine, operation of limit switch LS5 will cause solenoid S5 to be de-energized and solenoid S4 to be energized. De-energizing solenoid S5 permits plunger 76a to return to the position shown in Fig. 5. Energizing solenoid S4 will start a second cycle of operations which is substantially the same as the above described cycle except that tool slides 3 and 3a and carriages 9 and 9a move in directions opposite to those in which they move during the above described cycle.

If the electric circuit is adjusted to effect semi-automatic operation of the machine, operation of limit switch LS5 will cause solenoids S1 and S5 to be de-energized which will stop further operation of the machine. De-energizing solenoid S5 permits plunger 76a of valve V4 to return to the position shown in Fig. 5. De-energizing solenoid S1 permits pilot valve 67 to return to the position shown in Fig. 5 and thereby cause pump P1 to discharge liquid at the minimum rate through port A as explained above. With the parts in the positions occupied at the end of the above described cycle, closing the starting switch will cause solenoids S1 and S4 to be energized and start a second cycle of operations.

The hydraulic drive described herein may be modified in various ways and adapted to other machines without departing from the scope of the invention which is hereby claimed as follows:

1. A hydraulic drive, comprising a reversible pump having a first port and a second port, means for adjusting said pump to cause it to discharge liquid through either of said ports, hydraulic motor means having two pressure chambers, means for directing liquid from said first port to said chambers selectively to cause said motor means to operate in one direction or the other, a pair of reciprocating hydraulic motors each having a capacity greater than that of one of said chambers, means for directing liquid from said second port to corresponding ends of said motors selectively to cause one or the other of said motors to make a working stroke, a first channel connecting the other ends of said motors to each other to enable liquid discharged by either motor during a working stroke to enter the other motor and cause it to make a return stroke, means for permitting liquid to escape from said other end of either motor at a limited rate including an exhaust channel having a choke arranged therein and a pressure responsive valve connected between said exhaust channel and said other ends of said motors, and means for supplying liquid to said other end of either motor including said valve and a third channel connecting said valve to said first port, said valve normally blocking said exhaust channel and connecting said third channel to said other motor ends and being operable by pressure in said second port to block said third channel and to connect said other motor ends to said exhaust channel.

2. A drive according to claim 1 in which said hydraulic motors are arranged in vertical positions, said pump includes a displacement varying member which is continuously urged in a direction to cause said pump to discharge liquid through said first port, said pump adjusting means includes a first means for moving said member in the opposite direction and stopping it in a minimum displacement position to cause said pump to discharge liquid at a limited rate through said first port and a second means for moving said member farther in said opposite direction to cause said pump to discharge liquid through said second port, and which has a normally closed valve connected to said first port, a discharge channel connected to said valve and having a resistance valve arranged therein and adapted to open at a pressure high enough to enable one of said motors to support its load but not high enough to enable the other motor to raise its load, and means responsive to said member being adjusted to said minimum displacement position for opening said normally closed valve so that said pump can discharge through said resistance valve and the pressure created by said pump will enable said one motor to support its load.

3. A hydraulic drive according to claim 1 and including means for directing to said first port of said pump the liquid exhausted from either of said motors during the return stroke thereof, a second pump, a relief valve connected to said second pump to permit escape of liquid discharged thereby in excess of requirements, and means connecting said second pump to said first port of said first pump during the time said first pump is discharging liquid through said second port to thereby enable said second pump to maintain pressure in said motor means during that time.

4. A hydraulic drive, comprising a reversible pump having a first port and a second port, hydraulic motor means having two pressure chambers, means connecting both of said chambers to said first port including a first valve operable to direct liquid from said pump to one or the other of said chambers selectively, means for adjusting said pump to cause it to discharge liquid through said first port and thereby cause said motor means to operate in one direction or the other, a pair of reciprocating hydraulic motors each having a capacity greater than that of one of said chambers, means connecting corresponding ends of said motors to said second port including a second valve operable to direct liquid from said pump to one or the other of said motors selectively, means for reversing said pump to cause it to discharge liquid through said second port and thereby cause one or the other of said motors to make a working stroke, a first channel connecting the other ends of said motors to each other to enable liquid discharged by either motor during a working stroke to enter the other motor and cause it to make a return stroke, and means for bleeding a limited quantity of discharge liquid out of either motor during the working stroke thereof to prevent one motor from completing its return stroke before the other motor completes its working stroke and for supplying liquid to said other end of said one motor to cause that motor to complete its return stroke after said other motor completes its working stroke and including a second channel connected to said other ends of said motors, a third channel connected to said first port, a fourth channel connected to exhaust and having a choke connected therein, and a pressure responsive valve connected between said second, third and fourth channels, said valve normally blocking said fourth channel and connecting said second channel to said third channel and being operable by pressure in said second port to block said third channel and connect said second channel to said fourth channel.

5. A drive according to claim 4 in which said hydraulic motors are arranged in vertical positions, said pump includes a displacement varying member which is continuously urged in a direction to cause said pump to discharge liquid through said first port, said pump adjusting means includes a first means for moving said member in the opposite direction and stopping it in a minimum displacement position to cause said pump to discharge liquid at a limited rate through said first port and a second means for moving said member farther in said opposite direction to cause said pump to discharge liquid through said second port, and which has a normally closed valve connected to said first port, a discharge channel connected to said valve and having a resistance valve arranged therein and adapted to open at a pressure high enough to enable one of said motors to support its load but not high enough to enable the other motor to raise its load, and means responsive to said member being adjusted to said minimum displacement position for opening said normally closed valve so that said pump can discharge through said resistance valve and the pressure created by said pump will enable said one motor to support its load.

6. A hydraulic drive according to claim 4 and including means for directing to said first port of said pump the liquid exhausted from either of said motors during the return stroke thereof, a second pump, a relief valve connected to said second pump to permit escape of liquid discharged thereby in excess of requirements, and means connecting said second pump to said first port of said first pump during the time said first pump is discharging liquid through said second port to thereby enable said second pump to maintain pressure in said motor means during that time.

7. A drive according to claim 4 and including means operable in unison with said pump adjusting means for shifting said first valve in one direction or the other away from its initial position, means responsive to said motor means reaching the end of its movement for shifting said second valve in one direction or the other away from its initial position and for effecting operation of said pump reversing means, means responsive to either of said motors reaching the end of its working stroke for causing said first valve to return to its initial position and for effecting operation of said pump reversing means to cause said pump to discharge liquid through said first port to the motor making a return stroke, and means responsive to the returning motor reaching the limit of its movement for causing said second valve to return to its initial position and for causing said pump adjusting means to adjust said pump to a minimum displacement.

References Cited in the file of this patent

UNITED STATES PATENTS

| | | |
|---|---|---|
| 2,372,825 | Grad | Apr. 3, 1945 |
| 2,410,694 | Tyler | Nov. 5, 1946 |